(12) United States Patent
Pacheco Da Cunha

(10) Patent No.: US 9,032,868 B2
(45) Date of Patent: May 19, 2015

(54) SYSTEM FOR THE APPLICATION OF OZONE IN GRAINS

(76) Inventor: Otalicio Pacheco Da Cunha, Sao Leopolda RS (BR)

(*) Notice: Subject to any disclaimer, the term of this patent is extended or adjusted under 35 U.S.C. 154(b) by 1007 days.

(21) Appl. No.: 13/130,832

(22) PCT Filed: Nov. 24, 2009

(86) PCT No.: PCT/BR2009/000397
§ 371 (c)(1),
(2), (4) Date: May 24, 2011

(87) PCT Pub. No.: WO2010/060174
PCT Pub. Date: Jun. 3, 2010

(65) Prior Publication Data
US 2011/0252983 A1    Oct. 20, 2011

(30) Foreign Application Priority Data

Nov. 25, 2008 (BR) ........................... 0805087

(51) Int. Cl.
| | | |
|---|---|---|
| A47J 27/04 | (2006.01) |
| A23B 4/03 | (2006.01) |
| A23B 4/044 | (2006.01) |
| B60H 3/00 | (2006.01) |
| A23B 9/22 | (2006.01) |
| A23B 4/052 | (2006.01) |
| A23B 9/18 | (2006.01) |
| A23L 3/3445 | (2006.01) |
| A23N 15/08 | (2006.01) |
| A23B 7/144 | (2006.01) |
| A23N 7/00 | (2006.01) |
| A47J 43/24 | (2006.01) |
| A23G 1/10 | (2006.01) |

(Continued)

(52) U.S. Cl.
CPC . *A23B 9/22* (2013.01); *A23N 15/08* (2013.01); *A23B 7/144* (2013.01); *A23B 4/052* (2013.01); *A23N 7/005* (2013.01); *A47J 43/24* (2013.01); *A23G 1/10* (2013.01); *A23B 7/152* (2013.01); *A23B 7/10* (2013.01); *A47J 27/04* (2013.01); *A23B 9/18* (2013.01); *A23L 3/3445* (2013.01)

(58) Field of Classification Search
CPC .......... A23B 7/144; A23B 7/152; A23B 7/10; A23B 4/052; A47J 27/04; A47J 43/24; A23N 7/005; A23N 15/08; A23G 1/10
USPC ........... 99/467, 469, 473, 474, 477, 478, 485, 99/516, 534, 536
See application file for complete search history.

(56) References Cited

U.S. PATENT DOCUMENTS 1,975,805 A * 10/1934 Smith .............................. 99/451
2,212,575 A * 8/1940 Smith .............................. 43/142

(Continued)

FOREIGN PATENT DOCUMENTS

| FR | 2668034 A1 | 4/1992 |
| JP | 11180703 A | 7/1999 |

*Primary Examiner* — Dana Ross
*Assistant Examiner* — Hemant Mathew
(74) *Attorney, Agent, or Firm* — Zarley Law Firm, P.L.C.

(57) ABSTRACT

System for application of ozone on grains made up essentially by one or more ozone mixers with particulates separator (1) for injecting air in the grains mass, one or more ozone mixers (2) for injecting air in the grains mass, a base of the device for grains treatment with ozone (3), a transport and discharge device (4), and an air cooling filter (5) that can be used individually or jointly to apply ozone on the grains mass.

8 Claims, 5 Drawing Sheets

(51) Int. Cl.
*A23B 7/152* (2006.01)
*A23B 7/10* (2006.01)

(56) References Cited

U.S. PATENT DOCUMENTS

| | | | |
|---|---|---|---|
| 3,251,291 A * | 5/1966 | Thompson et al. | 99/470 |
| 3,455,803 A * | 7/1969 | Miller | 204/176 |
| 3,650,950 A * | 3/1972 | White | 210/758 |
| 4,386,055 A * | 5/1983 | McBride | 422/186.18 |
| 4,549,477 A * | 10/1985 | McCabe, Jr. | 99/477 |
| 6,086,833 A * | 7/2000 | Conners et al. | 422/292 |
| 6,276,304 B1 * | 8/2001 | Tai | 119/448 |
| 7,138,145 B2 * | 11/2006 | Walker et al. | 424/613 |
| 2003/0059507 A1 * | 3/2003 | Johnson | 426/321 |
| 2005/0112209 A1 * | 5/2005 | Walker et al. | 424/600 |
| 2006/0027505 A1 * | 2/2006 | Hayes et al. | 210/747 |
| 2006/0150829 A1 * | 7/2006 | Cheung | 99/472 |
| 2009/0191091 A1 * | 7/2009 | Danchenko et al. | 422/32 |

* cited by examiner

SYSTEM FOR THE APPLICATION OF OZONE IN GRAINS

BACKGROUND OF THE INVENTION

The present invention belongs, in a general way, to the technological sector of equipment for the storage of grains, and refers in a more specific way to a system for the application of ozone (O3) to grains, viewing to obtain the control of bacteria, virus, fungus, and insects.

The bacteria, virus, fungus, and insects control of stored grains is currently performed through the application of chemical products, which may let residual effects, and be harmful to the human health. Ozone, on the other hand, is a gas that presents no residual effect due to having a short life (from 25 to 30 minutes), besides presenting disinfection speed thousand times superior to the chemical products used up to the present time.

The proposed system takes into consideration the known grain characteristics, of ozone (O3), and of the noxious weeds to be fought, and operates in different procedures related to grains, individually or jointly, including their reception, transport, and the movement and storage.

SUMMARY OF THE INVENTION

The invention revealed in the present descriptive report comprises an ozone mixer with particles separator that provides the particles separation of the air taken in, the mixture and homogenization in adequate doses with ozonized air, and the liberation for application on grains (00) in towers; it also comprises ozone mixers that mix the adequate dose of ozone in the air taken in, which will be injected in the grains mass (00) or in the grains treatment tower) in a closed circuit; it also foresees a treatment base with ozone generators strategically positioned, with air flow directing blades, which force the air with ozone to permeate the grains mass (00); and, at last, it also comprises a transporter device, in which the unloading is equipped with ozone generators, with the purpose of permeating the injected ozone in the grains (00) discharge flow, the end of the discharge nozzle of the transporter being provided with an aspiration system of ozonized air, which extracts the entire particulates material existing in the grains (00), material that will be transported in an air flow of high speed to the base of the treatment system.

BRIEF DESCRIPTION OF THE DRAWINGS

So that the present invention is fully understood and taken to practice by any technician of this technological sector, it will be explained in a clear, concise, and sufficient form, having as basis the annexed drawing listed herein below, presented at title of example of the preferential concretization of the invention, their purpose not being to limit the protection just to a particular illustrated concretization.

DETAILED DESCRIPTION OF THE INVENTION

Figure 1:
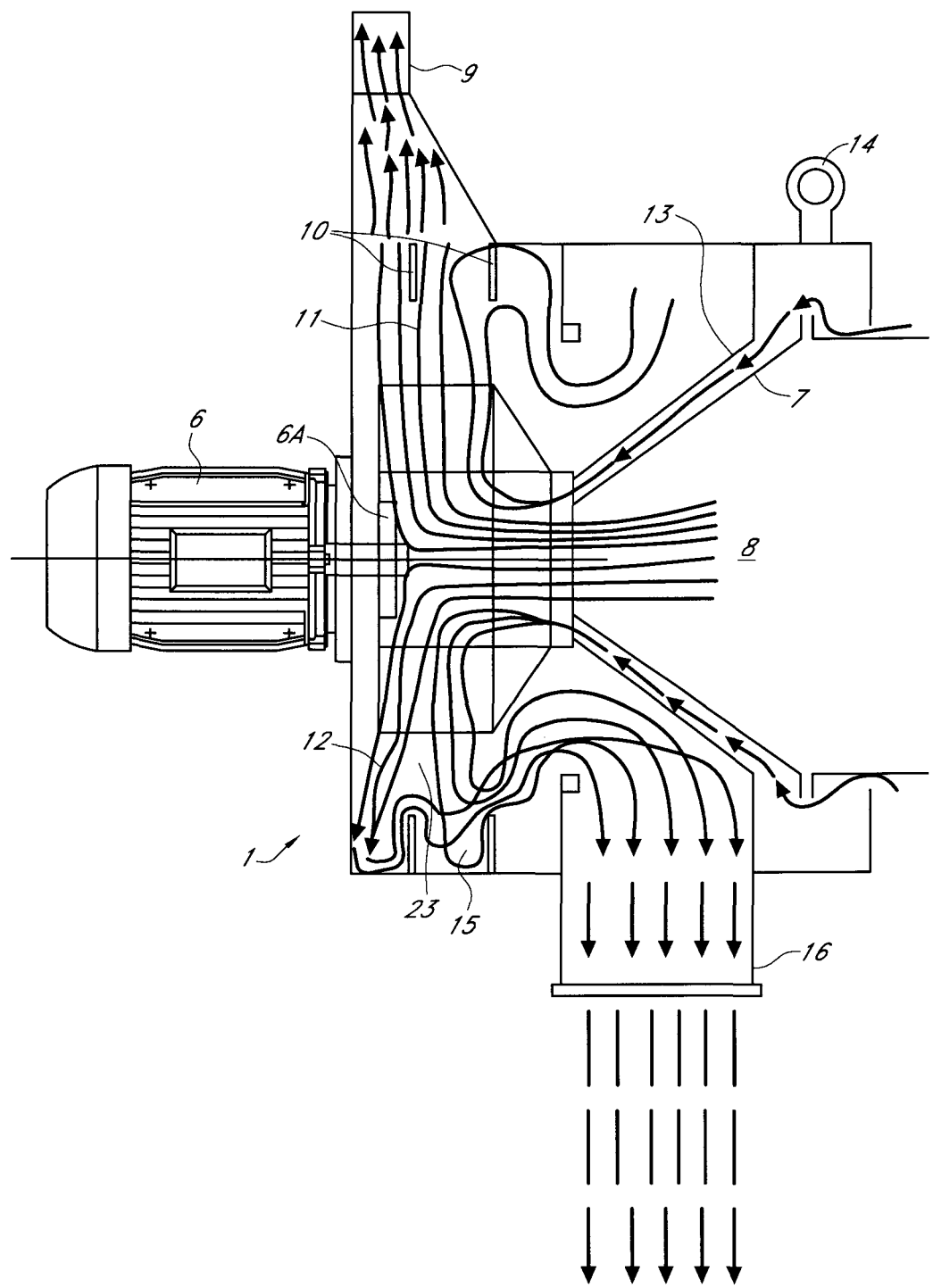
FIG. 1 is a plan cutaway view of an ozone mixer with particles separator for injecting air in the grain mass and other applications.

The system for applying ozone on grains object of this descriptive report, is essentially made-up by one or more ozone mixers with particles separator (1) for injecting air in the grains mass (00), one or more ozone mixers (2) for injecting air in the grains mass (00), a base of the grains treatment device with ozone (3), a transport and discharge device (4), and an air cooling filter (5) in the ozone humid product application tower (in the first stage), which can be used individually or jointly to apply ozone on the grains mass (00).

As it can be concluded from the FIG. 1 in annex, the ozone mixer with the particles separator (1) is made-up by an electric motor (6) coupled to a direct rotor or indirectly by generating air volume and pressure to take in and inject, associated to two aspirating cones. The internal cone (7) fed with air containing particles (8) (atmospheric air), which directs it to the bottom of the rotor, where it suffers centrifuging and separation due to the greater density, originating an air flow with high concentration of particulates that is directed to a primary discharge (9), assisted by two retention rings (10) of the particulate flow (11), part of the air (12) being directed by an air tube that opens and forms a perpendicular barrier of clean air. The external cone (13) directs the atmospheric air through one or more ozone generators (14, after being centrifuged to a chamber (15) where the mixture with air filtered of particles takes place (12) (through the process previously described), and the homogenization with the correct dose of ozone, the air will be discharged in the second exit (16), to be applied on grains in a treatment tower. The discharged in the primary (9), and secondary exit (16) will be without ozone in case its destination is a filtering system or if simply discharged in the environment.

Figure 2:
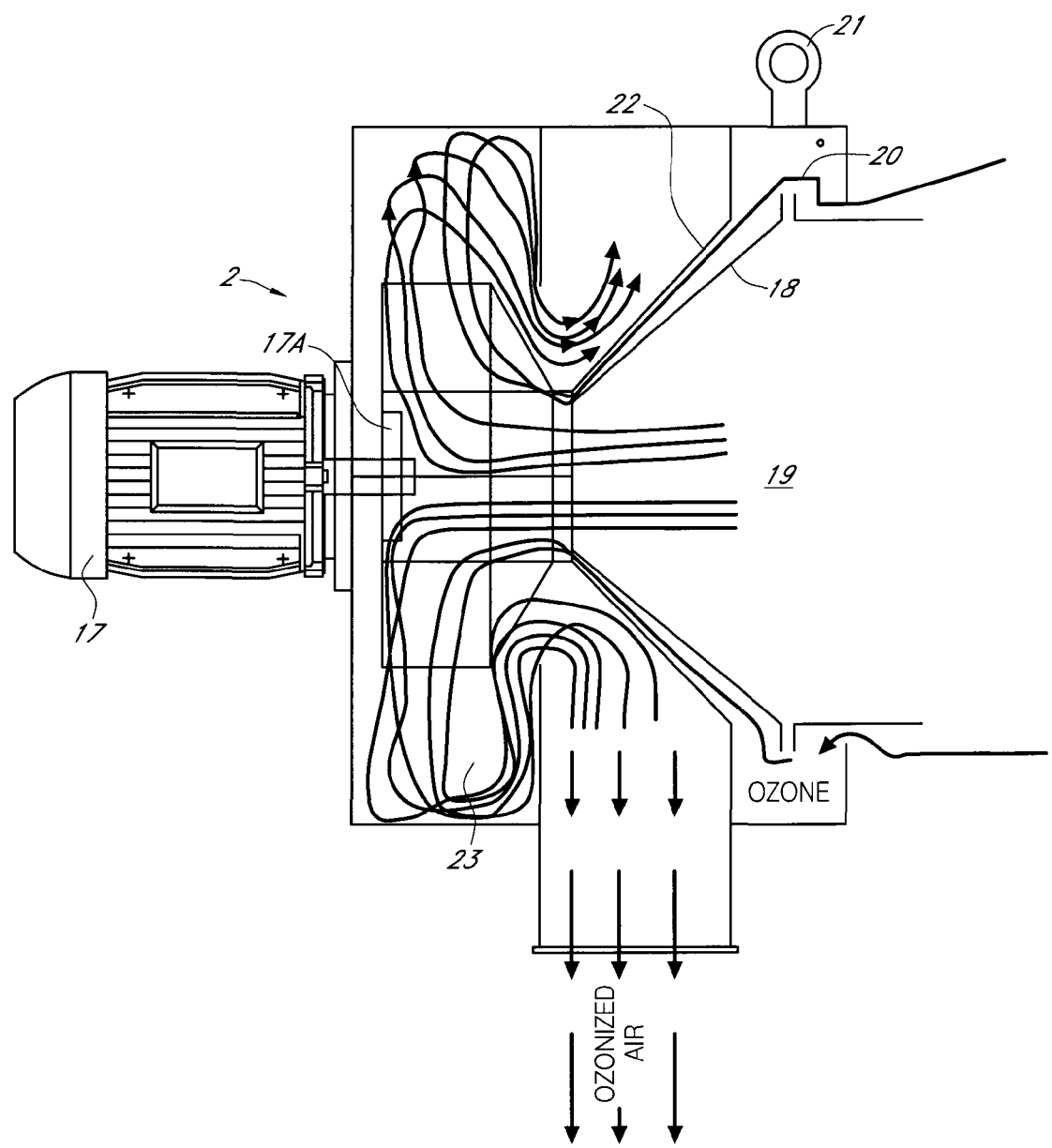
FIG. 2 is a plan cutaway view of an ozone mixer for injecting air in the grains mass (00) and other applications.

Now, referring to FIG. 2, we see that the ozone mixer (2) is an equipment with an electric motor (17) coupled to a rotor (17A) of air volume generation and of pressure to take in and inject, presenting two aspiration cones, the internal one (18) being fed with atmospheric air (19), which is directed to the bottom of the rotor (17A), together with the ionized air (20) by ozone generators (21) directed by the external cone (22), where the centrifugation forms a perpendicular barrier for the air mixture chamber (23), obtaining air without gradients of density and homogenized, with the adequate ozone dosing to inject in the grains mass (00) in silos or in grains treatment tower in a closed circuit or simply of injection of the ozonized air.

Figure 3:
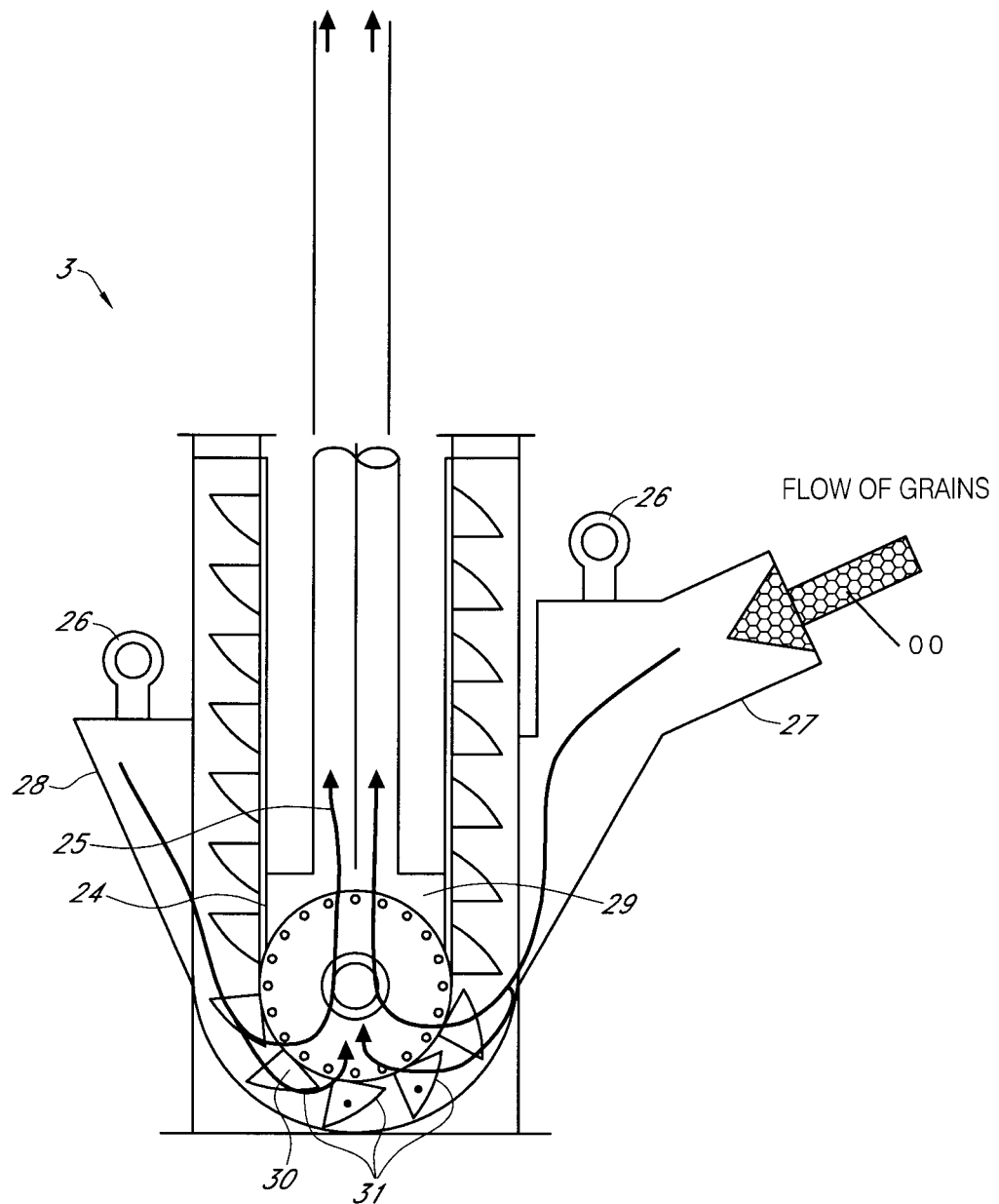
FIG. 3 is a plan cutaway view of the basis of the ozone treatment device.

FIG. 3 presents the base of the treatment device (3), built with blades for directing the air flow (24), which force the air (25), ozonized by one or more ozone generators (26), positioned in feeding troughs of grains and air (27), and air entry (28), through a negative pressure chamber (29), to permeate the grains mass (00), which will maintain the slotted pulley immersed. The suctioned air flows in all directions due to the turbulent filling of the concave blades (30) of bottoms with relief holes (31), which permit the ionized air to flow in the entire filling path and vertical displacement.

Figure 4:
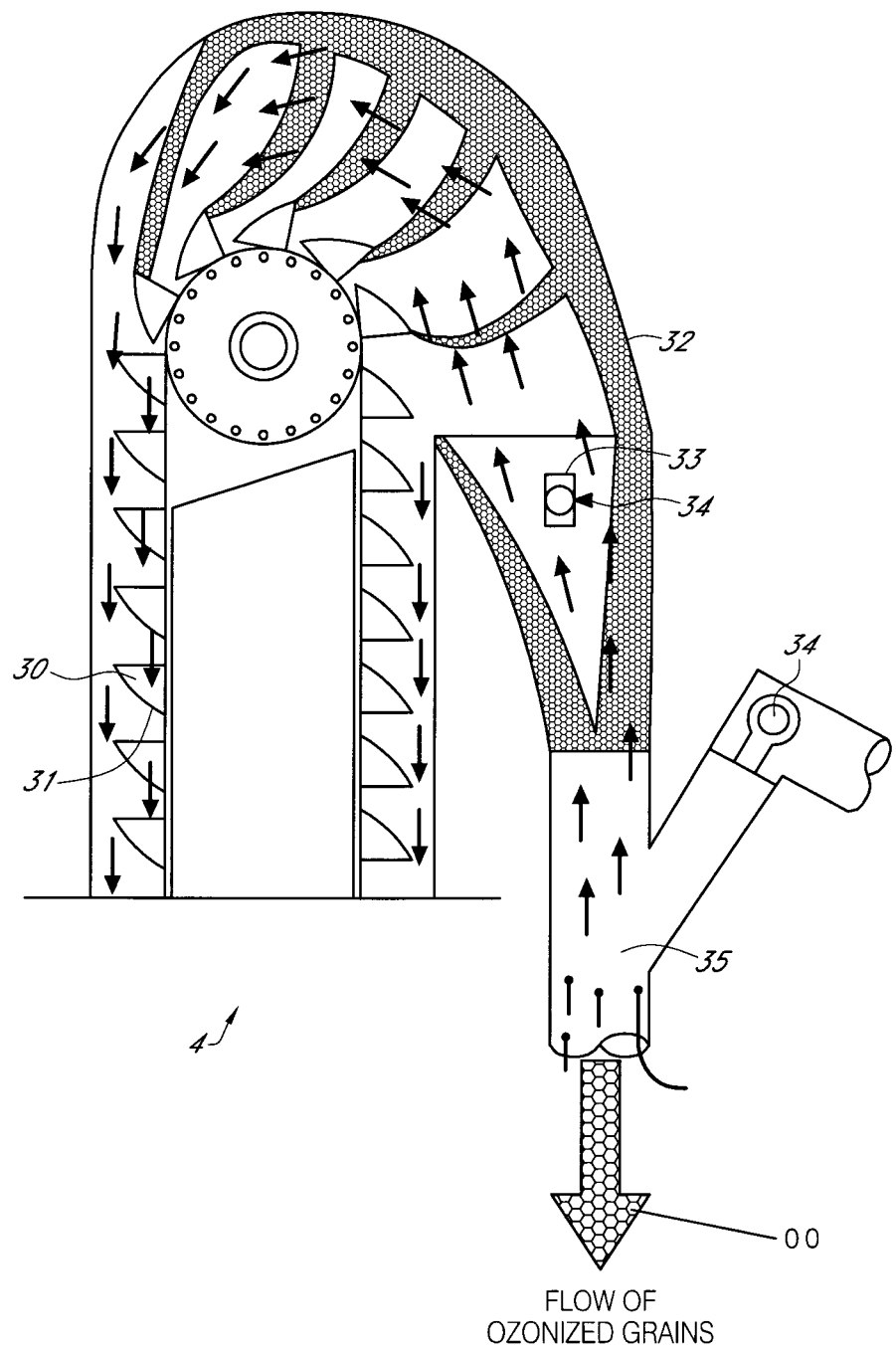
FIG. 4: Drawing in cut of the discharge of the ozone treatment device.

In the FIG. 4 is represented the treatment transporter device (4). The discharge (32) has lateral devices (33) to couple the ozone generators (34), in order to permeate the ozone in the grains discharge flow coming from the concave blades (30) with relief holes (31), while the discharge nozzle (35) presents an aspiration system of ozonized air, which makes the ozonized air to permeate the grains flow and simultaneously extracts the entire particulate material existing in the grains (00), such as pellicles, spores, fungus, bacteria, different kinds of powder, and others. All this material will be transported in an air flow of high speed to the treatment system base.

Figure 5:
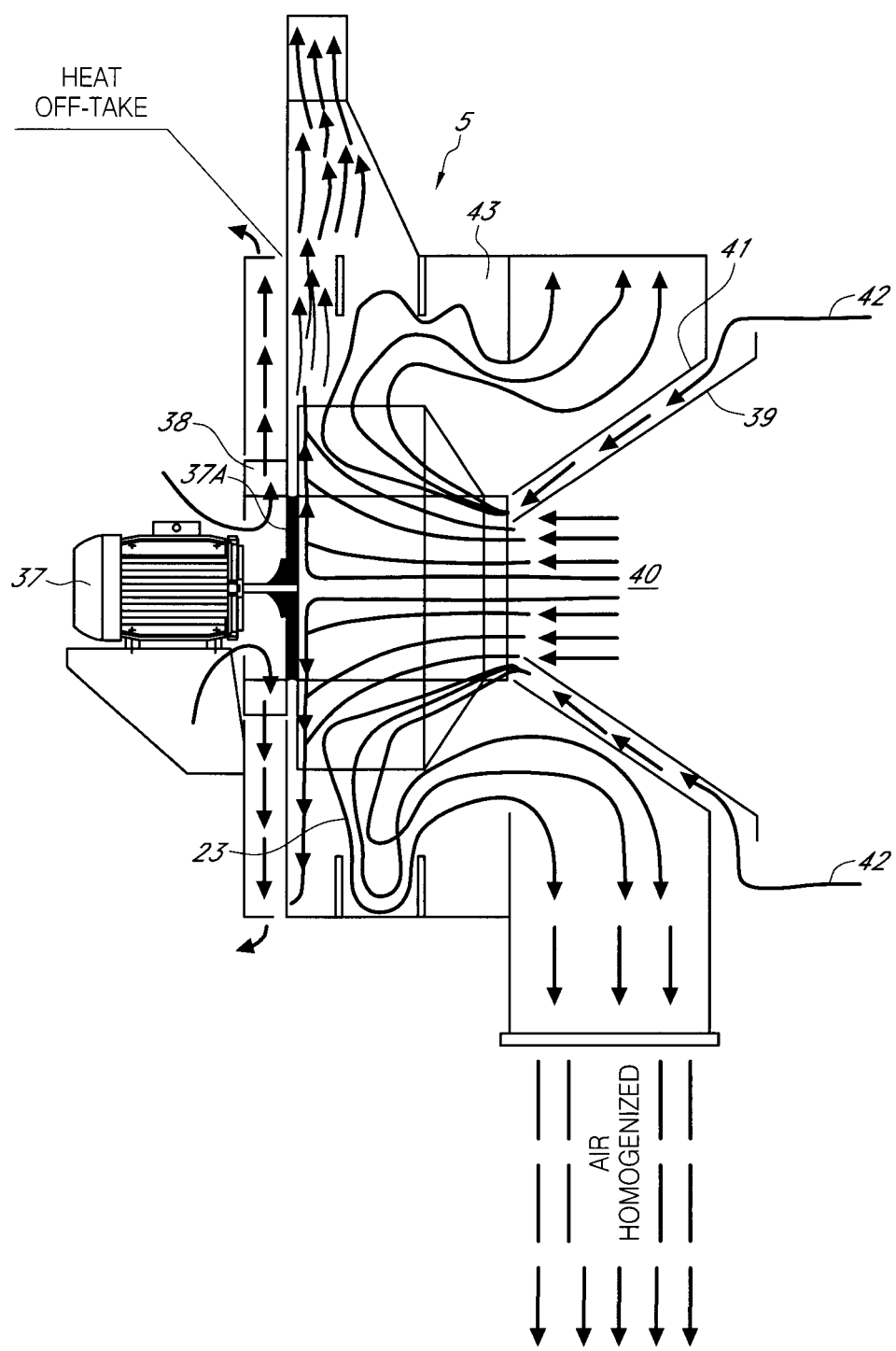
FIG. 5: Drawing in cut of the air cooling filter.

FIG. 5 presents the air cooling filter (5) that is used in the ozone application tower of the humid product, in the first stage, afterwards going to the "grains" (00) product drying with hot air, which cools this air with particulates, filtration, and mixture of the entire air, being constituted by an electric motor (37) associated to a heat extraction rotor (37A), an internal cone (39) that aspirates the hot air with residues (40), and an external cone (41) that aspirates the cold air (42), and performs the mixture of the two in the chamber (43).

The present descriptive report was about an invention for industrial application, inventive novelty and activity, presenting, therefore, all requirements determined by law to receive the requested privilege.

The invention claimed is:

1. A system for applying ozone on grains in a grain storage, treatment or handling device, comprising:
    a chamber;
    a cone system;
    a motor;
    a rotor;
    the rotor positioned within the chamber, the rotor coupled to the motor such that rotation of the motor rotates the rotor;
    the cone system connected to the chamber and positioned adjacent the rotor;
    the cone system having an external cone and an internal cone, the internal cone positioned inward of the external cone with a space between the internal cone and the external cone thereby forming a first air inlet through the internal cone and a second air inlet through the space between the internal cone and the external cone into the chamber;
    wherein the first air inlet in the internal cone is fed with atmospheric air containing particles which directs the atmospheric air containing particles to the rotor within the chamber;
    wherein the second air inlet between the internal cone and the external cone is fed with atmospheric air to the rotor within the chamber;
    an ozone generator operably connected to the cone system;
    at least one exit fluidly connected to the chamber;
    wherein when the motor rotates the rotor, a stream of airflow is generated and air is pulled into the chamber through the first air inlet and the second air inlet of the cone system and out the at least one exit;
    wherein when the air is pulled through the first air inlet and the second air inlet of the cone system, ozone is injected into the stream of airflow that moves in the space between the internal cone and the external cone by the ozone generator.

2. The system of claim 1 wherein the discharge exit is fluidly connected to a grain storage or handling device such that the airflow containing the injected ozone is applied to a mass of grains in the grain storage or handling device.

3. The system of claim 1 wherein the external cone directs air through the ozone generator.

4. The system of claim 1 wherein the air and injected ozone are mixed in the chamber to form a homogeneous mixture with the correct dose of ozone.

5. The system of claim 1 further comprising two retention rings positioned in the chamber that assist with mixing the air and ozone combination.

6. The system of claim 1 further comprising a wall positioned within the chamber, the wall forming a perpendicular barrier to the stream of airflow from the rotor that assists with mixing the air and ozone combination.

7. The system of claim 1 further comprising wherein hot air is directed to the first air inlet of the internal cone from a grain drying process.

8. The system of claim 1 further comprising wherein hot air is directed to the first air inlet of the internal cone from a grain drying process, and cold air is directed to the second air inlet between the internal cone and the external cone such that the hot air and cold air are mixed in the chamber.

* * * * *